(12) United States Patent
Gruenstein et al.

(10) Patent No.: US 11,967,323 B2
(45) Date of Patent: *Apr. 23, 2024

(54) HOTWORD SUPPRESSION

(71) Applicant: GOOGLE LLC, Mountain View, CA (US)

(72) Inventors: Alexander H. Gruenstein, Mountain View, CA (US); Taral Pradeep Joglekar, Sunnyvale, CA (US); Vijayaditya Peddinti, San Jose, CA (US); Michiel A. U. Bacchiani, Summit, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,253

(22) Filed: Jun. 24, 2022

(65) Prior Publication Data
US 2022/0319519 A1 Oct. 6, 2022

Related U.S. Application Data

(63) Continuation of application No. 16/874,646, filed on May 14, 2020, now Pat. No. 11,373,652, which is a (Continued)

(51) Int. Cl.
*G10L 15/22* (2006.01)
*G10L 15/06* (2013.01)
(Continued)

(52) U.S. Cl.
CPC ............ *G10L 15/22* (2013.01); *G10L 15/063* (2013.01); *G10L 15/08* (2013.01); *G10L 15/30* (2013.01);
(Continued)

(58) Field of Classification Search
CPC ....... G10L 15/22; G10L 17/22; G10L 17/005; G10L 15/08; G10L 15/20; G10L 19/018;
(Continued)

(56) References Cited

U.S. PATENT DOCUMENTS

| 4,363,102 A | 12/1982 | Holmgren et al. |
| 5,659,665 A | 8/1997 | Whelpley, Jr. |

(Continued)

FOREIGN PATENT DOCUMENTS

| JP | S59-180599 | 10/1984 |
| JP | H11-52976 | 2/1999 |

(Continued)

OTHER PUBLICATIONS

Notice of Reasons for Rejection dated Apr. 24, 2023 in Japanese Patent Application No. 2020-565375 (with English language translation), citing documents 15-17 therein, 6 pages.

(Continued)

*Primary Examiner* — Vijay B Chawan
(74) *Attorney, Agent, or Firm* — Oblon, McClelland, Maier & Neustadt, L.L.P.

(57) ABSTRACT

A method includes adding, by a first computing device, a first audio watermark to first speech data corresponding to playback of a first utterance including a hotword used to invoke an attention of a second computing device. The method includes outputting, by the first computing device, the playback of the first utterance corresponding to the watermarked first speech data. The second computing device is configured to receive the watermarked first speech data and determine to cease processing of the watermarked first speech data.

20 Claims, 8 Drawing Sheets

Related U.S. Application Data continuation of application No. 16/418,415, filed on May 21, 2019, now Pat. No. 10,692,496.

(60) Provisional application No. 62/674,973, filed on May 22, 2018.

(51) Int. Cl.
*G10L 15/08* (2006.01)
*G10L 15/30* (2013.01)
*G10L 17/00* (2013.01)
*G10L 17/22* (2013.01)
*G10L 25/51* (2013.01)

(52) U.S. Cl.
CPC .............. *G10L 17/00* (2013.01); *G10L 17/22* (2013.01); *G10L 25/51* (2013.01); *G10L 2015/088* (2013.01)

(58) Field of Classification Search
CPC ......... G10L 17/00; G10L 15/26; G10L 15/30; G10L 2015/088; G10L 2015/223; G10L 2021/02082; G10L 21/0208; G10L 25/48; G10L 25/52; G10L 15/063; G10L 25/51
See application file for complete search history.

(56) References Cited

U.S. PATENT DOCUMENTS

| | | |
|---|---|---|
| 5,897,616 A | 4/1999 | Kanevsky et al. |
| 5,983,186 A | 11/1999 | Miyazawa et al. |
| 6,023,676 A | 2/2000 | Erel |
| 6,141,644 A | 10/2000 | Kuhn |
| 6,567,775 B1 | 5/2003 | Maali et al. |
| 6,671,672 B1 | 12/2003 | Heck |
| 6,744,860 B1 | 6/2004 | Schrage |
| 6,826,159 B1 | 11/2004 | Shaffer et al. |
| 6,931,375 B1 | 8/2005 | Bossemeyer, Jr. et al. |
| 6,973,426 B1 | 12/2005 | Schier et al. |
| 7,016,833 B2 | 3/2006 | Gable et al. |
| 7,222,072 B2 | 5/2007 | Chang |
| 7,571,014 B1 | 8/2009 | Lamboume et al. |
| 7,720,012 B1 | 5/2010 | Borah et al. |
| 7,904,297 B2 | 3/2011 | Mirkovic et al. |
| 8,099,288 B2 | 1/2012 | Zhang et al. |
| 8,194,624 B2 | 6/2012 | Park et al. |
| 8,200,488 B2 | 6/2012 | Kemp et al. |
| 8,209,174 B2 | 6/2012 | Al-Telmissani |
| 8,214,447 B2 | 7/2012 | Deslippe et al. |
| 8,340,975 B1 | 12/2012 | Rosenberger |
| 8,588,949 B2 | 11/2013 | Lamboume et al. |
| 8,670,985 B2 | 3/2014 | Lindahl et al. |
| 8,709,018 B2 | 4/2014 | Williams et al. |
| 8,713,119 B2 | 4/2014 | Lindahl |
| 8,717,949 B2 | 5/2014 | Crinon et al. |
| 8,719,009 B2 | 5/2014 | Baldwin et al. |
| 8,719,018 B2 | 5/2014 | Dinerstein |
| 8,768,687 B1 | 7/2014 | Quasthoff et al. |
| 8,775,191 B1 | 7/2014 | Sharifi et al. |
| 8,805,890 B2 | 8/2014 | Zhang et al. |
| 8,838,457 B2 | 9/2014 | Cerra et al. |
| 8,938,394 B1 | 1/2015 | Faaborg et al. |
| 8,996,372 B1 | 3/2015 | Secker-Walker et al. |
| 9,142,218 B2 | 9/2015 | Schroeter |
| 9,354,778 B2* | 5/2016 | Cornaby .............. G06F 3/0237 |
| 9,462,433 B2* | 10/2016 | Rodriguez ............ H04W 12/04 |
| 9,484,046 B2* | 11/2016 | Knudson ................ G10L 25/48 |
| 9,548,053 B1* | 1/2017 | Basye .................... G10L 15/22 |
| 10,074,371 B1 | 9/2018 | Wang et al. |
| 10,147,433 B1* | 12/2018 | Bradley ................ G10L 19/018 |
| 10,395,650 B2* | 8/2019 | Garcia .................... G10L 15/22 |
| 10,692,496 B2* | 6/2020 | Gruenstein ............ G10L 25/51 |
| 11,373,652 B2* | 6/2022 | Gruenstein ............ G10L 25/51 |
| 2002/0049596 A1 | 4/2002 | Burchard et al. |
| 2002/0072905 A1 | 6/2002 | White et al. |
| 2002/0123890 A1 | 9/2002 | Kopp et al. |
| 2002/0193991 A1 | 12/2002 | Bennett et al. |
| 2003/0018479 A1 | 1/2003 | Oh et al. |
| 2003/0200090 A1 | 10/2003 | Kawazoe |
| 2003/0231746 A1 | 12/2003 | Hunter et al. |
| 2004/0101112 A1 | 5/2004 | Kuo |
| 2005/0165607 A1 | 7/2005 | Di Fabbrizio et al. |
| 2006/0074656 A1 | 4/2006 | Mathias et al. |
| 2006/0085188 A1 | 4/2006 | Goodwin et al. |
| 2006/0184370 A1 | 8/2006 | Kwak et al. |
| 2007/0100620 A1 | 5/2007 | Tavares |
| 2007/0198262 A1 | 8/2007 | Mindlin et al. |
| 2008/0252595 A1 | 10/2008 | Boillot |
| 2009/0106796 A1 | 4/2009 | McCarthy et al. |
| 2009/0256972 A1 | 10/2009 | Ramaswamy et al. |
| 2009/0258333 A1 | 10/2009 | Yu |
| 2009/0292541 A1 | 11/2009 | Daya et al. |
| 2010/0057231 A1 | 3/2010 | Slater et al. |
| 2010/0070276 A1 | 3/2010 | Wasserblat et al. |
| 2010/0110834 A1 | 5/2010 | Kim et al. |
| 2011/0026722 A1 | 2/2011 | Jing et al. |
| 2011/0054892 A1 | 3/2011 | Jung et al. |
| 2011/0060587 A1 | 3/2011 | Phillips et al. |
| 2011/0066429 A1 | 3/2011 | Shperling et al. |
| 2011/0066437 A1 | 3/2011 | Luff |
| 2011/0184730 A1 | 7/2011 | LeBeau et al. |
| 2011/0304648 A1 | 12/2011 | Kim et al. |
| 2012/0084087 A1 | 4/2012 | Yang et al. |
| 2012/0232896 A1 | 9/2012 | Taleb et al. |
| 2012/0265528 A1 | 10/2012 | Gruber et al. |
| 2013/0024882 A1 | 1/2013 | Lee et al. |
| 2013/0060571 A1 | 3/2013 | Soemo et al. |
| 2013/0124207 A1 | 5/2013 | Sarin et al. |
| 2013/0132086 A1 | 5/2013 | Xu et al. |
| 2013/0150177 A1 | 6/2013 | Rodriguez et al. |
| 2013/0183944 A1 | 7/2013 | Mozer et al. |
| 2014/0012573 A1 | 1/2014 | Hung et al. |
| 2014/0012578 A1 | 1/2014 | Morioka |
| 2014/0088961 A1 | 3/2014 | Woodward et al. |
| 2014/0142958 A1 | 5/2014 | Sharma et al. |
| 2014/0222430 A1 | 8/2014 | Rao |
| 2014/0257821 A1 | 9/2014 | Adams et al. |
| 2014/0278383 A1 | 9/2014 | Fan |
| 2014/0278435 A1 | 9/2014 | Ganong, III et al. |
| 2015/0154953 A1 | 6/2015 | Bapat et al. |
| 2015/0262577 A1 | 9/2015 | Nomura |
| 2015/0293743 A1 | 10/2015 | Yang |
| 2015/0294666 A1* | 10/2015 | Miyasaka ............... G10L 15/08 704/251 |
| 2016/0049153 A1 | 2/2016 | Kakkirala et al. |
| 2016/0104483 A1 | 4/2016 | Foerster et al. |
| 2016/0104498 A1 | 4/2016 | Beack et al. |
| 2016/0260431 A1 | 9/2016 | Newendorp et al. |
| 2017/0084277 A1 | 3/2017 | Sharifi |
| 2017/0110130 A1 | 4/2017 | Sharifi et al. |
| 2017/0110144 A1 | 4/2017 | Sharifi et al. |
| 2017/0117108 A1 | 4/2017 | Richardson et al. |
| 2017/0251269 A1 | 8/2017 | Yoshizawa |
| 2018/0130469 A1* | 5/2018 | Gruenstein ............ G10L 25/51 |
| 2018/0182397 A1 | 6/2018 | Carbune et al. |
| 2018/0350356 A1* | 12/2018 | Garcia .................... G10L 15/22 |

FOREIGN PATENT DOCUMENTS

| | | |
|---|---|---|
| JP | H11-231896 | 8/1999 |
| JP | 2000-310999 | 11/2000 |
| JP | 2006227634 A | 8/2006 |
| JP | 2010-164992 A | 7/2010 |
| JP | 2020-526781 A | 8/2020 |
| KR | 10-2014-0031391 | 3/2014 |
| WO | 1998/0404875 | 9/1998 |
| WO | 2014/008194 | 1/2014 |
| WO | WO 2014/112110 A1 | 7/2014 |
| WO | 2015/025330 | 2/2015 |
| WO | WO 2020/068401 A1 | 4/2020 |

(56) References Cited

OTHER PUBLICATIONS

Office Action dated Feb. 27, 2023, in corresponding Korean Patent Application No. 10-2023-7002831 (with English Translation), 6 pages.
Office Action dated Mar. 31, 2022 in Korean Patent Application No. 10-2022-7036730, with English translation.
Office Action dated Dec. 9, 2021 in Indian Patent Application No. 202047050167, with concise English translation.
PCT International Search Report and Written Opinion in International Appin.No. PCT/US2019/033571 dated Aug. 1, 2019, 12 pages.
Calixto et al, "Effectiveness analysis of audio watermark tags for iptv second screen applications and synchronization," IEEE Xplore, Aug. 2014, 5 pages.
Thiagarajan et al, "Analysis of the mpeg-1 layer iii (mp3) algorithm using matlab," Synthesis Lectures on Algorithms and Software in Engineering, 2011, 131 pages.
Lin et al, "Audio Watermarking Techniques," in Audio Watermark. Springer, 2015, 44 pages.
Allen et al, "Image method for efficiently simulating small-room acoustics," The Journal of the Acoustical Society of America, Jun. 1978, 8 pages.
Auckenthaler et al. "Score Normalization for Text-independent Speaker Verification System," Digital Signal Processing, vol. 10, 2000, 13 pages.
Garcia. Digital Watermarking of Audio Signals using a Psychoacoustic Auditory Model and Spread Spectrum Theory, 107th Convention, Audio Engineering Society, New York, NY, Sep. 24-27, 1999, 42 pages.
International Search Report and Written Opinion, issued in International Application No. PCT/US2018/022101, dated May 25, 2018, 13 pages.
Jae-Seung, Choi, "Text-dependent Speaker Recognition using Characteristic Vectors in Speech Signal and Normalized Recognition Method," Journal of Korean Institute of Information Technology, 10(5), May 2012 (English Abstract).
Kim et al, "Generation of large-scale simulated utterances in virtual rooms to train deep-neural networks for far-field speech recognition in google home," Interspeech, Aug. 2017, 5 pages.
Kirovski et al, "Robust spread-spectrum audio water-marking," IEEE International Conference on, 2001, 3: 1345-1348, 4 pages.

Maheshwari et al. [online], "Burger King 'O.K.Google' Ad doesn't seem O.K. with Google," Apr. 2017, [retrieved May 12 21, 2019], retrieved from: URL «https://www.nytimes.com/2017/04/12/business/burger-king-tv-ad-google-home.html» 2 pages.
nationalpublicmedia.com <http://nationalpublicmedia.com> [online], "The smart audio report," NPR and E. Research, 2017, [retrieved on May 21, 2019], retrieved from: URL «https://www.nationalpublicmedia.com/smart-audio-report/latest-report/» 4 pages.
nielsen.com <http://nielsen.com> [online], "Super bowl Lli draws 103.4 million TV viewers, 170.7 million social media interactions." Feb. 2018, [retrieved on May 21, 2019], retrieved from: URL «https://www.nielsen.com/us/en/ insights/news/2018/super-bowl-lii-d raws-103-4-mil lion-tv-viewers-170-7-mi llion-social-media-interactions. html», 3 pages.
P. Kabal, "An examination and interpretation of itu-r bs. 1387: Perceptual evaluation of audio quality," TSP Lab Technical Report, Dept. Electrical & Computer Engineering, McGill University, 93 pages.
Pan et al, "A tutorial on mpeg/audio compression," IEEE Multimedia, 1995, 15 pages.
Perry et al [online], "A sleeping Alexa can listen for more than just her name," Feb. 2018, [retrieved May 21, 2019], retrieved from: URL «https://spectrum.ieee.org/view-from-the-valley/consumer-electronics/gadgets/beyond-the-super-bowl-a-sleeping-alexa-can-listen-for-more-than-just-her-name>>, 2 pages.
R. J. Anderson et al, "Information Hiding: An an-notated bibliography," University of Cambridge, 1999, 65 pages.
Sainath et al, "Convolutional neural networks for small footprint keyword spotting," in Sixteenth Annual Conference of the International Speech Communication Association, 2015, 5 pages.
twolame.org <http://twolame.org> [online], "Two LAME audio encoder," available on or before Feb. 22, 2016, via internet archive: Wayback Machine URL < < https://web.archive.org/web/20060222172741/http://www.twolame.org/», retrieved on May 21, 2019, URL<http://www.twolame.org/>, 1 page.
wikipedia.org <http://wikipedia.org> [online] "Super bowl," May 20, 2019 [retrieved May 21, 2019], retrieved from: URL «https://en.wikipedia.org/wiki/Super_Bowl», 21 pages.
Extended European Search Report dated Mar. 31, 2023 in European Patent Application No. 22195235.1, citing document 15 therein, 8 pages.

\* cited by examiner

US 11,967,323 B2

HOTWORD SUPPRESSION

CROSS-REFERENCE TO RELATED APPLICATION

This patent application is a continuation of, and claims priority under 35 U.S.C. § 120 from, U.S. patent application Ser. No. 16/874,646, filed on May 14, 2020, which is a continuation of U.S. patent application Ser. No. 16/418,415, filed on May 21, 2019 (now U.S. Pat. No. 10,692,496), which claims priority under 35 U.S.C. § 119(e), to U.S. Provisional Application No. 62/674,973, filed on May 22, 2018. The disclosures of these prior applications are considered part of the disclosure of this application and are hereby incorporated by reference in their entireties.

TECHNICAL FIELD

This disclosure generally relates to automated speech processing.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the users' manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed, e.g., to being directed at an individual present in the environment. One way to accomplish this is to use a "hotword", which by agreement among the users in the environment, is reserved as a predetermined word or words that is spoken to invoke the attention of the system. In an example environment, the hotword used to invoke the system's attention are the words "OK computer." Consequently, each time the words "OK computer" are spoken, it is picked up by a microphone, conveyed to the system, which may perform speech recognition techniques or use audio features and neural networks to determine whether the hotword was spoken and, if so, awaits an ensuing command or query. Accordingly, utterances directed at the system take the general form [HOTWORD][QUERY], where "HOTWORD" in this example is "OK computer" and "QUERY" can be any question, command, declaration, or other request that can be speech recognized, parsed and acted on by the system, either alone or in conjunction with the server via the network.

This disclosure discusses an audio watermarking based approach to distinguish rerecorded speech, e.g. broadcasted speech or text-to-speech audio, from live speech. This distinction enables detection of false hotwords triggers in an input comprising rerecorded speech, and allows the false hotword trigger(s) to be suppressed. Live speech input from a user will not, however be watermarked, and hotwords in a speech input that is determined not to be watermarked may be not suppressed. The watermark detection mechanisms are robust to noisy and reverberant environments and may use a convolutional neural network based detector which is designed to satisfy the goals of small footprint, both memory and computation, and low latency. The scalability advantages of this approach are highlighted in preventing simultaneous hotword triggers on millions of devices during large viewership television events.

Hotword based triggering may be a mechanism for activating virtual assistants. Distinguishing hotwords in live speech from those in recorded speech, e.g., advertisements, may be a problem as false hotword triggers lead to unintentional activation of the virtual assistant. Moreover, where a user has virtual assistants installed on multiple devices it is even possible for speech output from one virtual assistant to contain a hotword that unintentionally triggers another virtual assistant. Unintentional activation of a virtual assistant may generally be undesirable. For example, if a virtual assistant is used to control home automation devices, unintentional activation of the virtual assistant may for example lead to lighting, heating or air-conditioning equipment being unintentionally turned on, thereby leading to unnecessary energy consumption, as well as being inconvenient for the user. Also, when a device is turned on it may transmit messages to other devices (for example, to retrieve information from other devices, to signal its status to other devices, to communicate with a search engine to perform a search, etc.) so that unintentionally turning on a device may also lead to unnecessary network traffic and/or unnecessary use of processing capacity, to unnecessary power consumption, etc. Moreover, unintentional activation of equipment, such as lighting, heating or air-conditioning equipment, can cause unnecessary wear of the equipment and degrade its reliability. Further, as the range of virtual assistant-controlled equipment and devices increases, so does the possibility that unintentional activation of a virtual assistant may be potentially dangerous. Also, unintentional activation of a virtual assistant can cause concerns over privacy.

According to an innovative aspect of the subject matter described in this application, a method for suppressing hotwords includes the actions of receiving, by a computing device, audio data corresponding to playback of an utterance; providing, by the computing device, the audio data as an input to a model (i) that is configured to determine whether a given audio data sample includes an audio watermark and (ii) that was trained using watermarked audio data samples that each include an audio watermark sample and non-watermarked audio data samples that do not each include an audio watermark sample; receiving, by the computing device and from the model (i) that is configured to determine whether the given audio data sample includes the audio watermark and (ii) that was trained using the watermarked audio data samples that include the audio watermark and the non-watermarked audio data samples that do not include the audio watermark, data indicating whether the audio data includes the audio watermark; and, based on the data indicating whether the audio data includes the audio watermark, determining, by the computing device, to continue or cease processing of the audio data.

These and other implementations can each optionally include one or more of the following features. The action of receiving the data indicating whether the audio data includes the audio watermark includes receiving the data indicating that the audio data includes the audio watermark. The action of determining to continue or cease processing of the audio data includes determining to cease processing of the audio data based on receiving the data indicating that the audio data includes the audio watermark. The actions further include, based on determining to cease processing of the audio data, ceasing, by the computing device, processing of the audio data. The action of receiving the data indicating whether the audio data includes the audio watermark includes receiving the data indicating that the audio data does not include the audio watermark. The action of determining to continue or cease processing of the audio data includes determining to continue processing of the audio data based on receiving the data indicating that the audio data does not include the audio watermark.

The actions further include, based on determining to continue processing of the audio data, continuing, by the computing device, processing of the audio data. The action of processing of the audio data includes generating a transcription of the utterance by performing speech recognition on the audio data. The action of processing of the audio data includes determining whether the audio data includes an utterance of a particular, predefined hotword. The actions further include, before providing the audio data as an input to the model (i) that is configured to determine whether a given audio data sample includes an audio watermark and (ii) that was trained using watermarked audio data samples that each include an audio watermark sample and non-watermarked audio data samples that do not each include an audio watermark sample, determining, by the computing device, that the audio data includes an utterance of a particular, predefined hotword. The actions further include determining, by the computing device, that the audio data includes an utterance of a particular, predefined hotword. The action of providing the audio data as an input to the model (i) that is configured to determine whether a given audio data sample includes an audio watermark and (ii) that was trained using watermarked audio data samples that each include an audio watermark sample and non-watermarked audio data samples that do not each include an audio watermark sample is in response to determining that the audio data includes an utterance of a particular, predefined hotword.

The actions further include receiving, by the computing device, the watermarked audio data samples that each include an audio watermark, the non-watermarked audio data samples that do not each include an audio watermark, and data indicating whether each watermarked and non-watermarked audio sample includes an audio watermark; and training, by the computing device and using machine learning, the model using the watermarked audio data samples that each include an audio watermark, the non-watermarked audio data samples that do not each include the audio watermark, and the data indicating whether each watermarked and non-watermarked audio sample includes an audio watermark. At least a portion of the watermarked audio data samples each include an audio watermark at multiple, periodic locations. Audio watermarks in one of the watermarked audio data samples are different to audio watermark in another of the watermarked audio data samples. The actions further include determining, by the computing device, a first time of receipt of the audio data corresponding to playback of an utterance; receiving, by the computing device, a second time that an additional computing device provided, for output, the audio data corresponding to playback of an utterance and data indicating whether the audio data included a watermark; determining, by the computing device, that the first time matches the second time; and, based on determining that the first time matches the second time, updating, by the computing device, the model using the data indicating whether the audio data included a watermark.

Other implementations of this aspect include corresponding systems, apparatus, and computer programs recorded on computer storage devices, each configured to perform the operations of the methods. Other implementations of this aspect include a computer-readable medium storing software comprising instructions executable by one or more computers which, upon such execution, cause the one or more computers to perform operations comprising any of the methods described herein.

Particular implementations of the subject matter described in this specification can be implemented so as to realize one or more of the following advantages. A computing device may respond to hotwords included in live speech while not responding to hotwords that are included in recorded media. This can reduce or prevent unintentional activation of the device, and so save battery power and processing capacity of the computing device. Network bandwidth may also be preserved with fewer computing devices performing search queries upon receiving hotwords with audio watermarks.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
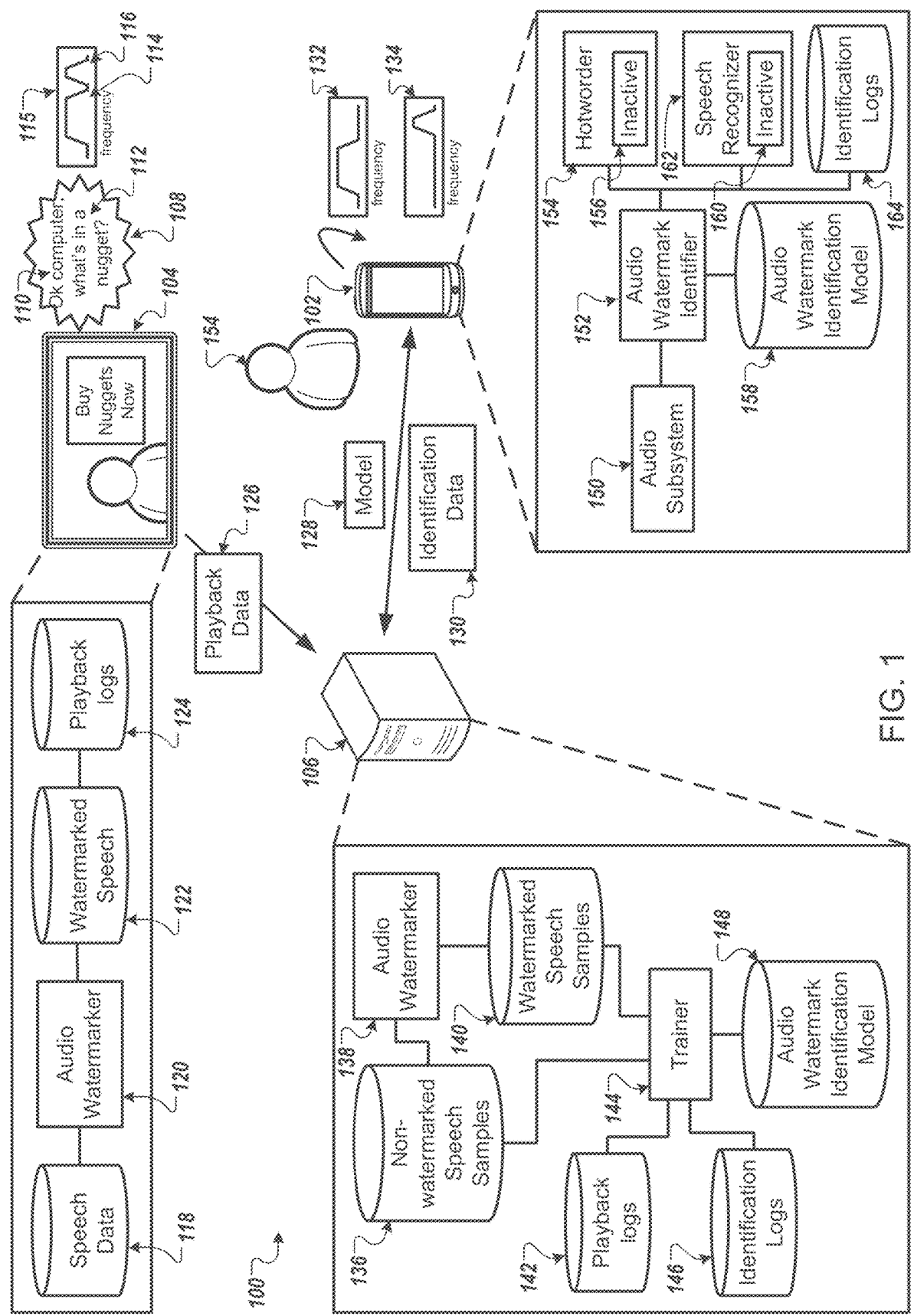
FIG. 1 illustrates an example system for suppressing hotword triggers when detecting a hotword in recorded media.

FIG. 1 illustrates an example system 100 for suppressing hotword triggers when detecting a "hotword" in recorded media. Briefly, and as described in more detail below, the computing device 104 outputs an utterance 108 that includes an audio watermark 116 and an utterance of a predefined hotword 110. The computing device 102 detects the utterance 108 and determines that the utterance 108 includes the audio watermark 134 by using an audio watermark identification model 158. Based on the utterance 108 including the audio watermark 134, the computing device 102 does not respond to the predefined hotword 110.

In more detail, the computing device 104 is playing a commercial for Nugget World. During the commercial, an actor in the commercial says the utterance 108, "Ok computer, what's in a nugget?" The utterance 108 includes the hotword 110 "Ok computer" and a query 112 that includes other terms of "what's in a nugget?" The computing device 104 outputs the utterance 108 through a loudspeaker. Any computing device in the vicinity with a microphone is able to detect the utterance 108.

The audio of the utterance 108 includes a speech portion 114 and an audio watermark 116. The creator of the commercial may add the audio watermark 116 to ensure computing devices that detect the utterance 108 do not respond to the hotword 110. In some implementations, the audio watermark 116 may include audio frequencies that are higher or lower than the human hearing range. For example, the audio watermark 116 may include frequencies that are greater than 20 kHz or less than 20 Hz. In some implementations, the audio watermark 116 may include audio that is within the human hearing range but is not detectable by humans because of its sounds similar to noise. For example, the audio watermark 116 may include a frequency pattern between 8 and 10 kHz. The strength of different frequency bands may be imperceptible to a human, but may be detectable by a computing device. As illustrated by the frequency domain representation 115, the utterance 108 includes an audio watermark 116 that is in a higher frequency range than the audible portion 114.

In some implementations, the computing device 104 may use an audio watermarker 120 to add a watermark to speech data 118. The speech data 118 may be the recorded utterance 108 of "Ok computer, what's in a nugget?" The audio watermarker 120 may add a watermark at periodic intervals in the speech data 118. For example, the audio watermarker 120 may add a watermark every two hundred milliseconds. In some implementations, the computing device 104 may identify the portion of the speech data 118 that includes the hotword 110, for example, by performing speech recognition. The audio watermarker 120 may add periodic watermarks over the audio of the hotword 110, before the hotword 110, and/or after the hotword 110. For example, the audio watermarker 120 can add three (or any other number) watermarks at periodic intervals over the audio of "ok computer."

The techniques for adding a watermark 120 are discussed in detail below with respect to FIGS. 3-7. In general, each watermark 120 is different for each speech data sample. The audio watermarker 120 may add an audio watermark every two or three hundred milliseconds to the audio of utterance 108 and add a different or the same audio watermark every two or three hundred milliseconds to audio of the utterance, "Ok computer, order a cheese pizza." The audio watermarker 120 may generate a watermark for each audio sample such that the watermark minimizes distortion of the audio sample. This may be important because the audio watermarker 120 may add watermarks that are within the frequency range that humans can detect. The computing device 104 may store the watermarked audio samples in the watermarked speech 112 for later output by the computing device 104.

In some implementations, each time the computing device 104 outputs watermarked audio, the computing device 104 may store data indicating the outputted audio in the playback logs 124. The playback logs 124 may include data identifying any combination of the outputted audio 108, the date and time of outputting the audio 108, the computing device 104, the location of the computing device 104, a transcription of the audio 108, and the audio 108 without the watermark.

The computing device 102 detects the utterance 108 through a microphone. The computing device 102 may be any type of device that is capable of receiving audio. For example, computing device 102 can be a desktop computer, laptop computer, a tablet computer, a wearable computer, a cellular phone, a smart phone, a music player, an e-book reader, a navigation system, a smart speaker and home assistant, wireless (e.g., Bluetooth) headset, hearing aid, smart watch, smart glasses, activity tracker, or any other appropriate computing device. As illustrated in FIG. 1, computing device 102 is a smart phone. The computing device 104 can be any device capable of outputting audio such as, for example, a television, a radio, a music player, a desktop computer, laptop computer, a tablet computer, a wearable computer, a cellular phone, or a smart phone. As illustrated in FIG. 1, the computing device 104 is a television.

The microphone of computing device 102 may be part of an audio subsystem 150. The audio subsystem 150 may include buffers, filters, analog to digital converters that are each designed to initially process the audio received through the microphone. The buffer may store the current audio received through the microphone and processed by the audio subsystem 150. For example, the buffer stores the previous five seconds of audio data.

The computing device 102 includes an audio watermark identifier 152. The audio watermark identifier 152 is configured to process the audio received through the microphone and/or stored in the buffer and identify audio watermarks that are included in the audio. The audio watermark identifier 152 may be configured to provide the processed audio as an input to the audio watermark identification model 158. The audio watermark identification model 158 may be configured to receive audio data and output data indicating whether the audio data includes a watermark. For example, the audio watermark identifier 152 may continuously provide audio processed through the audio subsystem 150 to the audio watermark identification model 158. As the audio watermark identifier 152 provides more audio, the accuracy of the audio watermark identification model 158 may increase. For example, after three hundred milliseconds, the audio watermark identification model 158 may have received audio that includes one watermarks. After five hundred milliseconds, the audio watermark identification model 158 may have received audio that includes two watermarks. In an embodiment where the watermarks in any one audio sample are all identical to one another, the audio watermark identification model 158 can improve its accuracy by processing more audio.

In some implementations, the audio watermark identifier 152 may be configured to remove any detected watermark from the audio received from the audio subsystem 150. After removing the watermark, the audio watermark identifier 152 may provide audio without the watermark to the hotworder 154 and/or the speech recognizer 162. In some implementations, the audio watermark identifier 152 may be configured to pass the audio received from the audio subsystem 150 to the hotworder 154 and/or the speech recognizer 162 without removing the watermark.

The hotworder 154 is configured to identify hotwords in audio received through the microphone and/or stored in the buffer. In some implementations, the hotworder 154 may be active at any time that the computing device 102 are powered on. The hotworder 154 may continuously analyze the audio data stored in the buffer. The hotworder 154 computes a hotword confidence score that reflects the likelihood that current audio data in the buffer includes a hotword. To compute the hotword confidence score, the hotworder 154 may extract audio features from the audio data such as filterbank energies or mel-frequency cepstral coefficients. The hotworder 154 may use classifying windows to process these audio features such as by using a support vector machine or a neural network. In some implementations, the hotworder 154 does not perform speech recognition to determine a hotword confidence score (for example by comparing extracted audio features from the received audio with corresponding audio features for one or more of hotwords, but without using the extracted audio features to perform speech recognition on the audio data). The hotworder 154 determines that the audio includes a hotword if the hotword confidence score satisfies a hotword confidence score threshold. For example, the hotworder 154 determines that the audio that corresponds to utterance 108 includes the hotword 110 if the hotword confidence score is 0.8 and the hotword confidence score threshold is 0.7. In some instances, the hotword may be referred to as a wake up word or an attention word.

The speech recognizer 162 may perform any type of process that generates a transcription based on incoming audio. For example, the speech recognizer 162 may user an acoustic model to identify phonemes in the audio data in the buffer. The speech recognizer 162 may use a language model to determine a transcription that corresponds to the phonemes. As another example, the speech recognizer 162 may use a single model that processes the audio data in the buffer and outputs a transcription.

In instances where the audio watermark identification model 158 determines that that the audio includes a watermark, the audio watermark identifier 152 may deactivate the speech recognizer 162 and/or the hotworder 154. By deactivating the speech recognizer 162 and/or the hotworder 154, the audio watermark identifier 152 may prevent further processing of the audio that may trigger the computing device 102 to respond to the hotword 110 and/or the query 112. As illustrated in FIG. 1, the audio watermark identifier 152 sets the hotworder 154 to an inactive state 156 and the speech recognizer 162 to an inactive state 160.

In some implementations, the default state of the hotworder 154 may be an active state and the default state of the speech recognizer 162 may be an active state. In this instance, the inactive state 156 and the inactive state 162 may expire after a predetermined amount of time. For example, after five seconds (or another predetermined amount of time), the states of both the hotworder 154 and the speech recognizer 162 may return to an active state. The five second period may renew each time the audio watermark identifier 152 detects an audio watermark. For example, if the audio 115 of the utterance 108 includes watermarks throughout the duration of the audio, then the hotworder 154 and the speech recognizer 162 may be set to the inactive state 156 and the inactive state 162 and may remain in that state for an additional five seconds after the end of the computing device 104 outputting the utterance 108. As another example, if the audio 115 of the utterance 108 includes watermarks throughout the utterance of the hotword 110, then the hotworder 154 and the speech recognizer 162 may be set to the inactive state 156 and the inactive state 162 and may remain in that state for an additional five seconds after the computing device 104 outputs the hotword 110, which will overlap outputting of the query 108.

In some implementations, the audio watermark identifier 152 may store data in the identification logs 164 that indicates a date and time that the audio watermark identifier 152 identified a watermark. For example, the audio watermark identifier 152 may identify a watermark in the audio of utterance 110 at 3-15 pm on Jun. 10, 2019. The identification logs 164 may store data identifying any combination of the time and date of receipt of the watermark, the transcription of the utterance that includes the watermark 134, the computing device 102, the watermark 134, the location of the computing device 102 when detecting the watermark, the underlying audio 132, the combined audio and watermark, and any audio detected a period of time before or after the utterance 108 or the watermark 134.

In some implementations, audio watermark identifier 152 may store data in the identification logs 164 that indicates a date and time that the audio watermark identifier 152 did not identify a watermark and the hotworder 154 identified a hotword. For example, at 7:15 pm on Jun. 20, 2019 the audio watermark identifier 152 may not identify a watermark in the audio of an utterance, and the hotworder 154 may identify a hotword in the audio of the utterance. The identification logs 164 may store data identifying any combination of the time and date of receipt of the non-watermarked audio and the hotword, the transcription of the utterance, the computing device 102, the location of the computing device, the audio detected a period of time before or after the utterance or the hotword.

In some implementations, the hotworder 154 may process the audio received from the audio subsystem 150 before, after, or concurrently with the audio watermark identifier 152. For example, the audio watermark identifier 152 may determine that the audio of the utterance 108 includes a watermark, and, at the same time, the hotworder 154 may determine that the audio of the utterance 108 includes a hotword. In this instance, the audio watermark identifier 152 may set the state of the speech recognizer 162 to the inactive state 160. The audio watermark identifier 152 may not be able to update the state 156 of the hotworder 154.

In some implementations, before the audio watermark identifier 152 uses the audio watermark identification model 158, the computing device 106 generates the watermark identification model 130 and provides the watermark identification model 130 to the computing device 102. The computing device 106 uses non-watermarked speech samples 136, an audio watermarker 138, and a trainer 144 that uses machine learning to generate the audio watermark identification models 148.

The non-watermarked speech samples 136 may include various speech samples collected under various conditions. The non-watermarked speech samples 136 may include audio samples of different users saying different terms, saying the same terms, saying terms with different types of background noise, saying terms in different languages, saying terms in different accents, saying terms recorded by different devices, etc. In some implementations, the non-watermarked speech samples 136 each include an utterance of a hotword. In some implementations, only some of the non-watermarked speech samples 136 include an utterance of a hotword.

The audio watermarker 138 may generate a different watermark for each non-watermarked speech sample. The audio watermarker 138 may generate one or more watermarked speech samples 140 for each non-watermarked speech sample. Using the same non-watermarked speech sample, the audio watermarker 138 may generate a watermarked speech sample that includes watermarks every two hundred milliseconds and another watermarked speech sample that includes watermarks every three hundred milliseconds. The audio watermarker 138 may also generate a watermarked speech sample that includes watermarks only overlapping the hotword, if present. The audio watermarker 138 may also generate a watermarked speech sample that includes watermarks that overlap the hotword and precede the hotword. In this instance, the audio watermarker 138 can make four different watermarked speech samples with the same non-watermarked speech sample. The audio watermarker 138 can also make more or less than four. In some instances, the audio watermarker 138 may operate similarly to the audio watermarker 120.

The trainer 144 uses machine learning and training data that includes the non-watermarked speech samples 136 and the watermarked speech samples 140 to generate the audio watermark identification model 148. Because the non-watermarked speech samples 136 and the watermarked speech samples 140 are labeled as including a watermark or not including a watermark, the trainer 148 can use training data that includes the non-watermarked speech samples 136 and labels that indicate that each sample does not include a watermark and the watermarked speech samples 140 and labels that indicate that each sample includes a watermark. The trainer 144, uses machine learning, to generate the audio watermark identification model 148 to be able to receive an audio sample and output whether the audio sample includes a watermark.

The computing device 106 can access the audio watermark identification model 148 and provide the model 128 to the computing device 102 to use in processing received audio data. The computing device 102 can store the model 128 in the audio watermark identification model 158.

The computing device 106 may update the audio watermark identification model 148 based on the playback logs 142 and the identification logs 146. The playback logs 142 may include data such as the playback data 126 received from the computing device 104 and stored in the playback logs 124. The playback logs 142 may include playback data from multiple computing devices that have outputted watermarked audio. The identification logs 146 may include data such as the identification data 130 received from the computing device 102 and stored in identification logs 164. The identification logs 146 may include additional identification data from multiple computing devices that are configured to identify audio watermarks and prevent execution of any command or queries included in the watermarked audio.

The trainer 144 may compare the playback logs 142 and the identification logs 146 to identify the matching entries that indicate that a computing device outputted watermarked audio and another computing device identified the watermark in the watermarked audio. The trainer 144 may also identify watermark identification errors in the identification logs 146 and the playback logs 142. A first type of watermark identification error may occur when the identification logs 146 indicate that a computing device identifies a watermark, but the playback logs 142 do not indicate the output of watermarked audio. A second type of watermark identification error may occur when the playback logs 142 indicate the output of watermarked audio, but the identification logs 146 indicate that a computing device in the vicinity of the watermarked audio did not identify the watermark.

The trainer 144 may update the errors and use the corresponding audio data as additional training data to update the audio watermark identification model 148. The trainer 144 may also update the audio watermark identification model 148 using the audio where the computing devices properly identified the watermarks. The trainer 144 may use both the audio outputted by the computing devices and the audio detected by the computing devices as training data. The trainer 144 may update the audio watermark identification model 148 using machine learning and the audio data stored in the playback logs 142 and the identification logs 146. The trainer 144 may use the watermarking labels provided in the playback logs 142 and identification logs 146 and the corrected labels from the error identification technique described above as part of the machine learning training process.

In some implementations, the computing device 102 and several other computing devices may be configured to transmit the audio 115 to a server for processing by a server-based hotworder and/or a server-based speech recognizer that are running on the server. The audio watermark identifier 152 may indicate that the audio 115 does not include an audio watermark. Based on that determination, the computing device 102 may transmit the audio to the server for further processing by the server-based hotworder and/or the server-based speech recognizer. The audio watermark identifiers of the several other computing devices may also indicate that the audio 115 does not include an audio watermark. Based on those determinations, each of the other computing devices may transmit their respective audio to the server for further processing by the server-based hotworder and/or the server-based speech recognizer. The server may determine whether audio from each computing device includes a hotword and/or generate a transcription of the audio and transmit the results back to each computing device.

In some implementations, the server may receive data indicating a watermark confidence score for each of the watermark decisions. The server may determine that the audio received the by the computing device 102 and the other computing devices is from the same source based on the location of the computing device 102 and the other computing devices, characteristics of the received audio, receiving each audio portion at a similar time, and any other similar indicators. In some instances, each of the watermark confidence scores may be within a particular range that includes a watermark confidence score threshold on one end of the range and another confidence score that may be a percentage difference from the watermark confidence score threshold, such as five percent less. For example, the range may be the watermark confidence score threshold of 0.80 to 0.76. In other instances, the other end of the range may be a fixed distance from the watermark confidence score threshold, such as 0.05. For example, the range may be the watermark confidence score threshold of 0.80 to 0.75.

If the server determines that each of the watermark confidence scores are within the range of being near the watermark confidence score threshold but not satisfying it, then the server may determine that the watermark confidence score threshold should be adjusted. In this instance, the server may adjust the watermark confidence score threshold to the lower end of the range. In some implementations, the server may update the watermarked speech samples 140 by including the audio received from each computing device in the watermarked speech samples 140. The trainer 144 may update the audio watermark identification model 148 using machine learning and the updated watermarked speech samples 140.

While FIG. 1 illustrates three different computing devices performing the different functions described above, any combination of one or more computing devices can perform any combination of the functions. For example, the computing device 102 may train the audio watermark identification model 148 instead of a separate computing device 106 training the audio watermark identification model 148.

Figure 2:
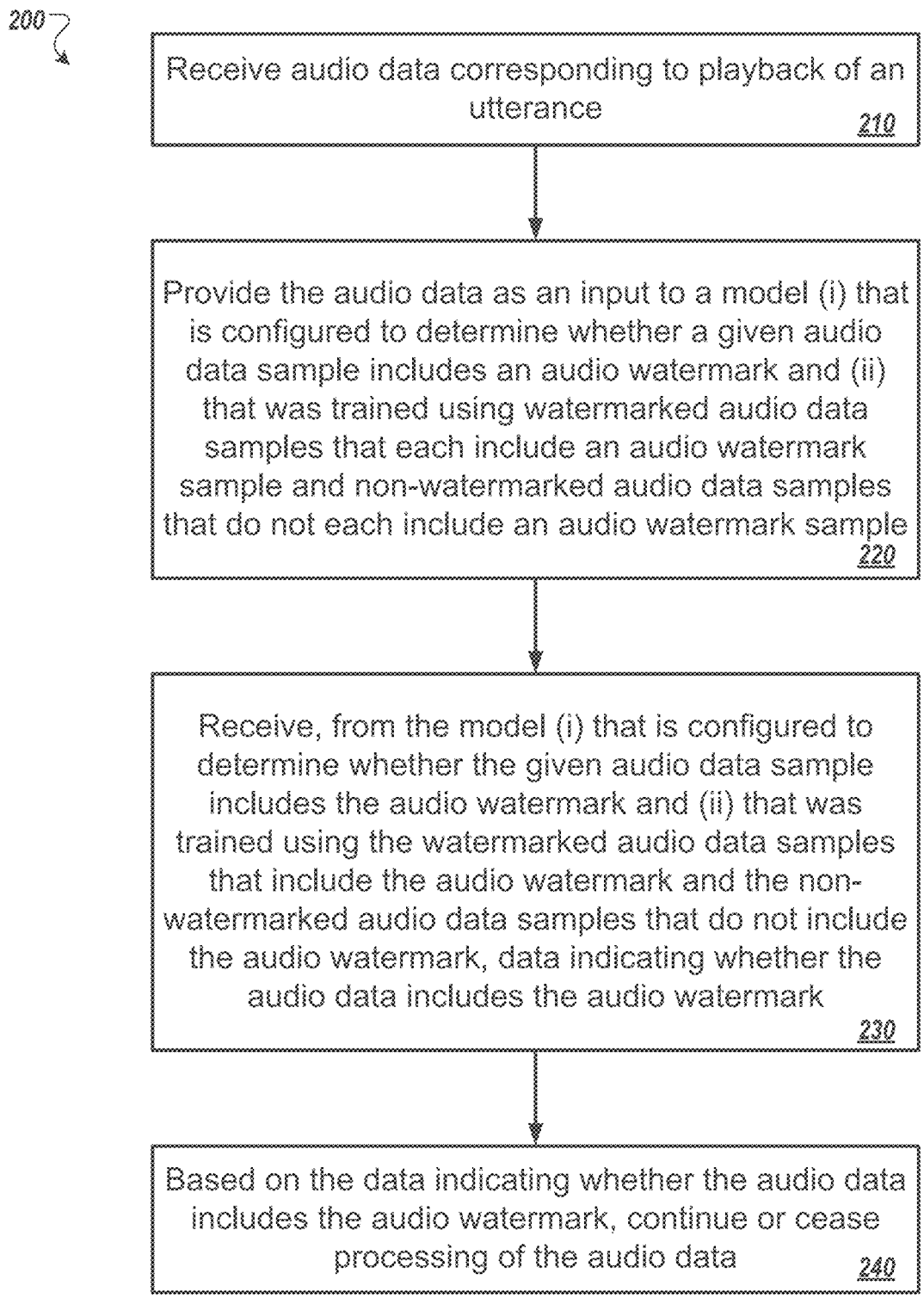
FIG. 2 is a flowchart of an example process for suppressing hotword triggers when detecting a hotword in recorded media.

FIG. 2 illustrates an example process 200 for suppressing hotword triggers when detecting a hotword in recorded media. In general, the process 200 processes received audio to determine whether the audio includes an audio watermark. If the audio includes an audio watermark, then the process 200 may suppress further processing of the audio. If the audio does not include an audio watermark, then the process 200 continues to process the audio and execute any query or command included in the audio. The process 200 will be described as being performed by a computer system comprising one or more computers, for example, the computing devices 102, 104, and/or 106 as shown in FIG. 1.

The system receives audio data corresponding to playback of an utterance (210). For example, a television may be playing a commercial and an actor in the commercial may say, "Ok computer, turn on the lights." The system includes a microphone, and the microphone detects the audio of the commercial including the utterance of the actor.

The system provides the audio data as an input to a model (i) that is configured to determine whether a given audio data sample includes an audio watermark and (ii) that was trained using watermarked audio data samples that each include an audio watermark sample and non-watermarked audio data samples that do not each include an audio watermark sample (220). In some implementations, the system may determine that the audio data includes a hotword. Based on detecting the hotword, the system provides the audio data as an input to the model. For example, the system may determine that the audio data include "ok computer." Based on detecting "ok computer," the system provides the audio data to the model. The system may provide the portion of the audio data that included the hotword and the audio received after the hotword. In some instances, the system may provide a portion of audio from before the hotword.

In some implementations, the system may analyze the audio data to determine whether the audio data includes a hotword. The analysis may occur before or after providing the audio data as an input to the model. In some implementations, the system may train the model using machine learning and watermarked audio data samples that each include an audio watermark, non-watermarked audio data samples that do not each include an audio watermark, and data indicating whether each watermarked and non-watermarked audio sample includes an audio watermark. The system may train the model to output data indicating whether audio input to the model includes a watermark or does not include a watermark.

In some implementations, different watermarked audio signals may include different watermarks from one another (the watermarks in any one audio sample may be all identical to one another, but with watermarks in one audio signal being different to watermarks in another audio signal). The system may generate a different watermark for each audio signal to minimize distortion in the audio signal. In some implementations, the system may place the watermark at periodic intervals in the audio signal. For example, the system may place the watermark every two hundred milliseconds. In some implementations, the system may place the watermark over the audio that includes the hotword and/or a period of time before the hotword.

The system receives, from the model (i) that is configured to determine whether the given audio data sample includes the audio watermark and (ii) that was trained using the watermarked audio data samples that include the audio watermark and the non-watermarked audio data samples that do not include the audio watermark, data indicating whether the audio data includes the audio watermark (230). The system may receive an indication that the audio data includes a watermark or receive an indication that the audio data does not include a watermark.

The system, based on the data indicating whether the audio data includes the audio watermark, continues or ceases processing of the audio data (240). In some implementations, the system may cease processing of the audio data if the audio data includes the audio watermark. In some implementations, the system may continue processing of the audio data if the audio data does not include an audio watermark. In some implementations, the processing of the audio data may include performing speech recognition on the audio data and/or determining whether the audio data includes a hotword. In some implementations, the processing may include executing a query or command included in the audio data.

In some implementations, the system logs the time and date that the system received the audio data. The system may compare the time and date to a time and date received from the computing device that output the audio data. If the system determines that the date and time of the receipt of the audio data match the date and time of outputting the audio data, then the system may update the model using the audio data as additional training data. The system may identify whether the model was correct in determining whether the audio data included a watermark, and ensure that the audio data includes the correct watermark label when added to the training data.

In more detail, a software agent that can perform tasks for a user is generally referred to as a "virtual assistant". A virtual assistant may for example be actuated by voice input from the user—for example may be programmed to recognize one or more trigger words that, when spoken by the user, cause the virtual assistant to be activated and perform a task associated with the trigger word that has been spoken. Such a trigger word is often referred to as a "hotword". A virtual assistant may be provided on, for example, a user's computer mobile telephone or other user device. Alternatively, a virtual assistant may be integrated into another device, such as a so-called "smart speaker" (a type of wireless speaker with an integrated virtual assistant that offers interactive actions and hands-free activation with the help of one or more hotwords).

With the wide adoption of smart speakers additional issues arise. During events with large audience e.g., sports event that attracts over a 100 million viewers, advertisements with hotwords can lead to simultaneous triggering of virtual assistants. Due to the large viewership there can be a significant increase in the simultaneous queries to the speech recognition servers which can lead to denial-of-service (DOS).

Two possible mechanisms for filtering of false hotwords are those based on (1) audio fingerprinting, where the fingerprint from the query audio is checked against a database of fingerprints from known audio, like advertisements, to filter out false triggers, and (2) audio watermarking, where the audio is watermarked by the publisher and the query recorded by the virtual assistant is checked for the watermark for filtering.

This disclosure describes the design of a low-latency, small footprint watermark detector which uses convolutional neural networks. This watermark detector is trained to be robust to noisy and reverberant environments which may be frequent in the scenario-of-interest.

Audio watermarking may be used in copyright protection and second screen applications. In copyright protection watermark detection generally does not need to be latency sensitive as the entire audio signal is available for detection. In the case of second screen applications delays introduced due to high latency watermark detection may be tolerable. Unlike these two scenarios watermark detection in virtual assistants is very latency sensitive.

In known applications involving watermark detection, the embedded message constituting the watermark is typically unknown ahead of time, and the watermark detector has to decode the message sequence before it can determine whether the message sequence includes a watermark and, if so, determine the watermark. However, in some applications described herein, the watermark detector may be detecting a watermark pattern which is exactly known by the decoder/watermark detector. That is the publisher or provider of rerecorded speech content may watermark this with a watermark, and may make details of the watermark available to, for example, providers of a virtual assistant and/or providers of devices that include a virtual assistant. Similarly, the provider of a virtual assistant may arrange for speech output from the virtual assistant to be provided with a watermark and make details of the watermark available. As a result, once the watermark has been detected in a received message it is known that the received message is not live speech input from a user and the activation of a virtual assistant resulting from any hotword in the received message can be suppressed, without the need to wait until the entire message has been received and processed. This provides reduction in latency.

Some implementations for hotword suppression utilize the audio fingerprinting approach. This approach requires a fingerprint database of known audio. As maintenance of this database on the device is non-trivial on-device deployment of such solutions are not viable. However, a significant advantage of audio fingerprinting approach is that it may not require modifications to the audio publishing process. Hence, it can tackle even adversarial scenarios where the audio publisher is not a collaborator.

This disclosure describes a watermark based hotword suppression mechanism. The hotword suppression mechanism may use an on-device deployment that brings in the design constraints of memory and computation footprints. Further there is a constraint on latency to avoid impact on the user experience.

Watermark based approaches may require modification of the audio publishing process to add the watermark. Hence, they can sometimes only be used to detect audio published by collaborators. However, they may not require the maintenance of fingerprint databases. This feature enables several advantages.

A first advantage may be the feasibility of on-device deployment. This can be an advantage during high viewership events when several virtual assistants can get simultaneously triggered. Server based solutions for detecting these false triggers can lead to denial of service due to the scale of simultaneous triggers. A second advantage may be detection of unknown audio published by a collaborator, e.g., text-to-speech (TTS) synthesizer output where the publisher can be collaborative, but the audio is not known ahead of time. A third advantage may be scalability. Entities such as audio/video publishers on online platforms can watermark their audio to avoid triggering the virtual assistants. In some implementations, these platforms host several million hours of content which cannot be practically handled using the audio fingerprinting based approaches.

In some implementations, the watermark based approach described herein can be combined with the audio fingerprinting based approach which may have the ability to tackle adversarial agents.

The description below describes the watermark embedder and the watermark detector.

The watermark embedder may be based on spread spectrum based watermarking in the FFT domain. The watermark embedder may use a psychoacoustic model to estimate the minimum masking threshold (MMT) which is used to shape the amplitude of watermark signal.

Figure 3:
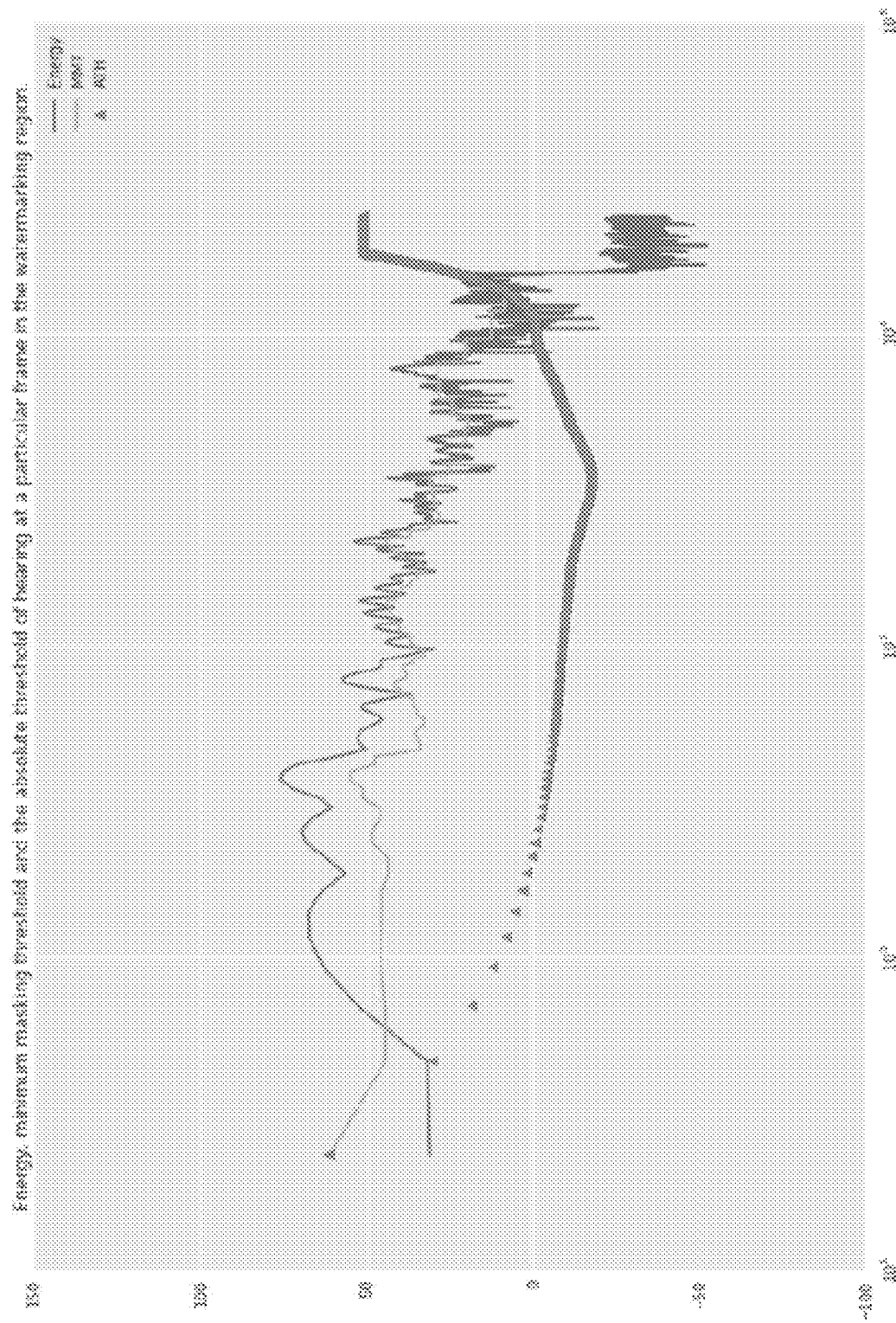
FIG. 3 illustrates an example minimum masking threshold, energy, and absolute threshold of hearing for a frame in the watermarking region.

To summarize this technique, regions of the host signal amenable for watermark addition are selected based on a minimum energy criterion. Discrete Fourier transform (DFT) coefficients are estimated for every host signal frame (25 ms windows-12.5 ms hop) in these regions. These DFT coefficients are used to estimate the minimum masking threshold (MMT) using the psychoacoustic model. The MMT is used to shape the magnitude spectrum for a frame of the watermark signal. FIG. 3 presents the estimated MMT, along with the host signal energy and absolute threshold of hearing. The phase of the host signal may be used for the watermark signal and the sign of the DFT coefficients is determined from the message payload. The message bit payload may be spread over a chunk of frames using multiple scrambling. In some implementations, the system may be detecting if a query is watermarked and may not have to transmit any payload. Hence, the system may randomly choose a sign matrix over a chunk of frames (e.g., 16 frames or 200 ms) and repeat this sign matrix across the watermarking region. This repetition of the sign matrix may be exploited to post-process the watermark detector output and improve the detection performance. Overlap add of the individual watermark frames may generate the watermark signal. Subplots (a) and (b) of FIG. 2 represent the magnitude spectra of the host signal and the watermark signal, and subplot (c) represents the sign matrix. The vertical lines represent the boundaries between two replications of the matrix.

The watermark signal may be added to the host signal in the time domain, after scaling it by a factor (e.g., $\alpha \in [0, 1]$), to further ensure inaudibility of the watermark. In some implementations, $\alpha$ is determined iteratively using objective evaluation metrics like Perceptual Evaluation of Audio Quality (PEAQ). In some implementations, the system may use conservative scaling factors (e.g., $\alpha \in \{0.1, 0.2, 0.3, 0.4, 0.5\}$) and evaluate detection performance at each of these scaling factors.

In some implementations, a design requirement for the watermark detector may be on-device deployment that places significant constraints on both the memory footprint of the model and its computational complexity. The description below describes convolutional neural network based model architectures for on-device keyword detection. In some implementations, the system may use temporal convolutional neural networks.

Figure 4:
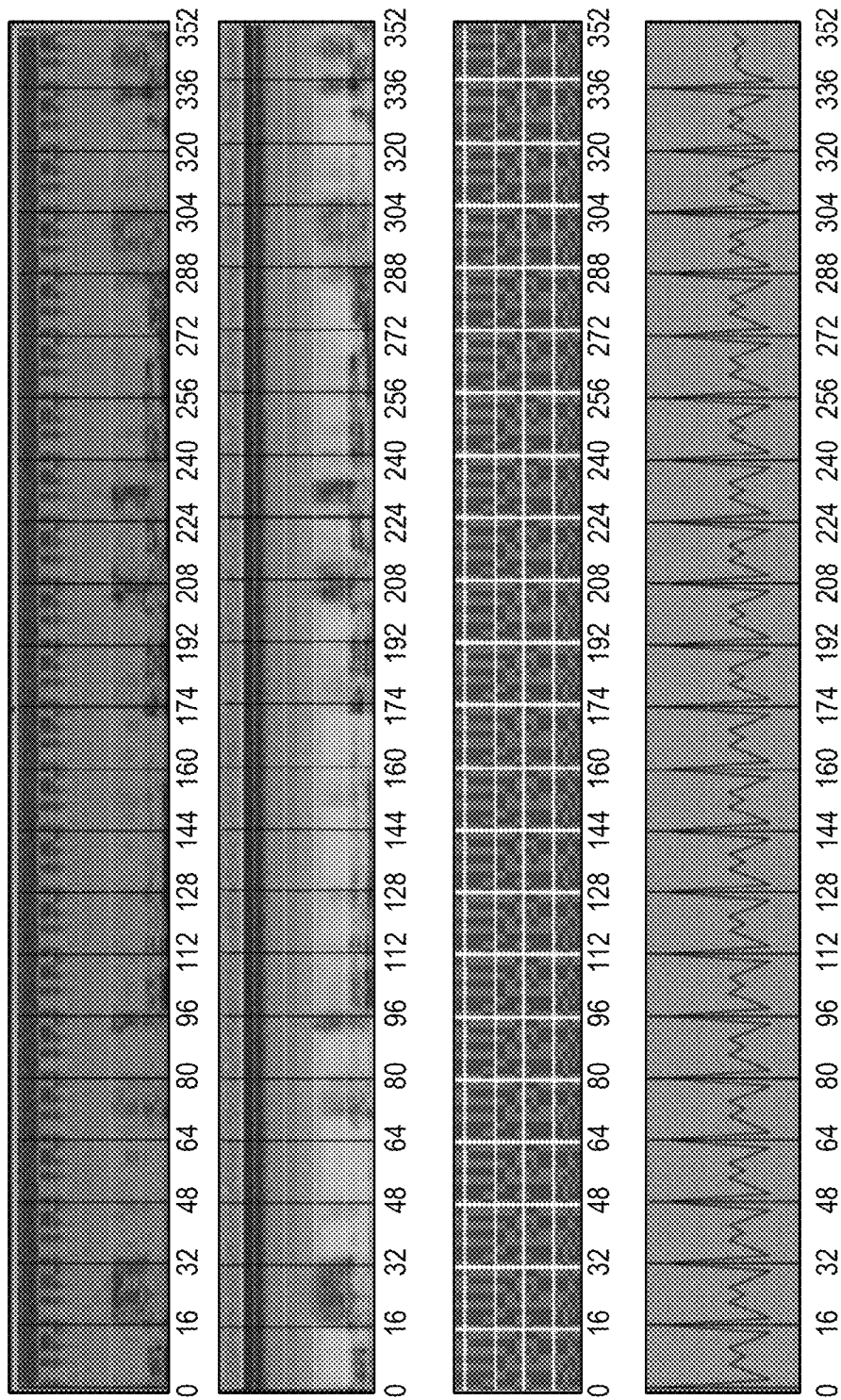
FIG. 4 illustrates an example magnitude spectrogram of the host signal, an example magnitude spectrogram of the watermark signal, an example replicated sign matrix of the watermark signal, and an example correlation of the replicated sign matrix pattern with a single instance of the sign matrix, where the vertical lines represent example boundaries of the watermark pattern between replications.
Figure 5:
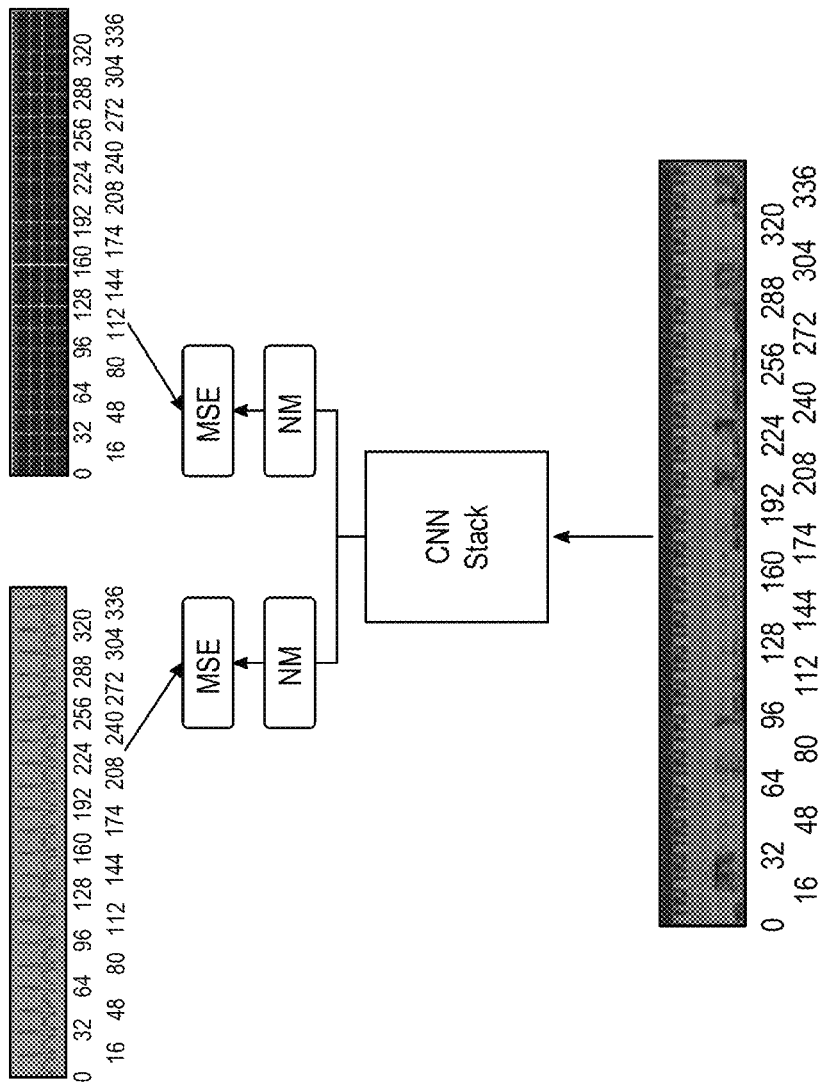
FIG. 5 illustrates an example neural network architecture used for the watermark detector.
Figure 6:
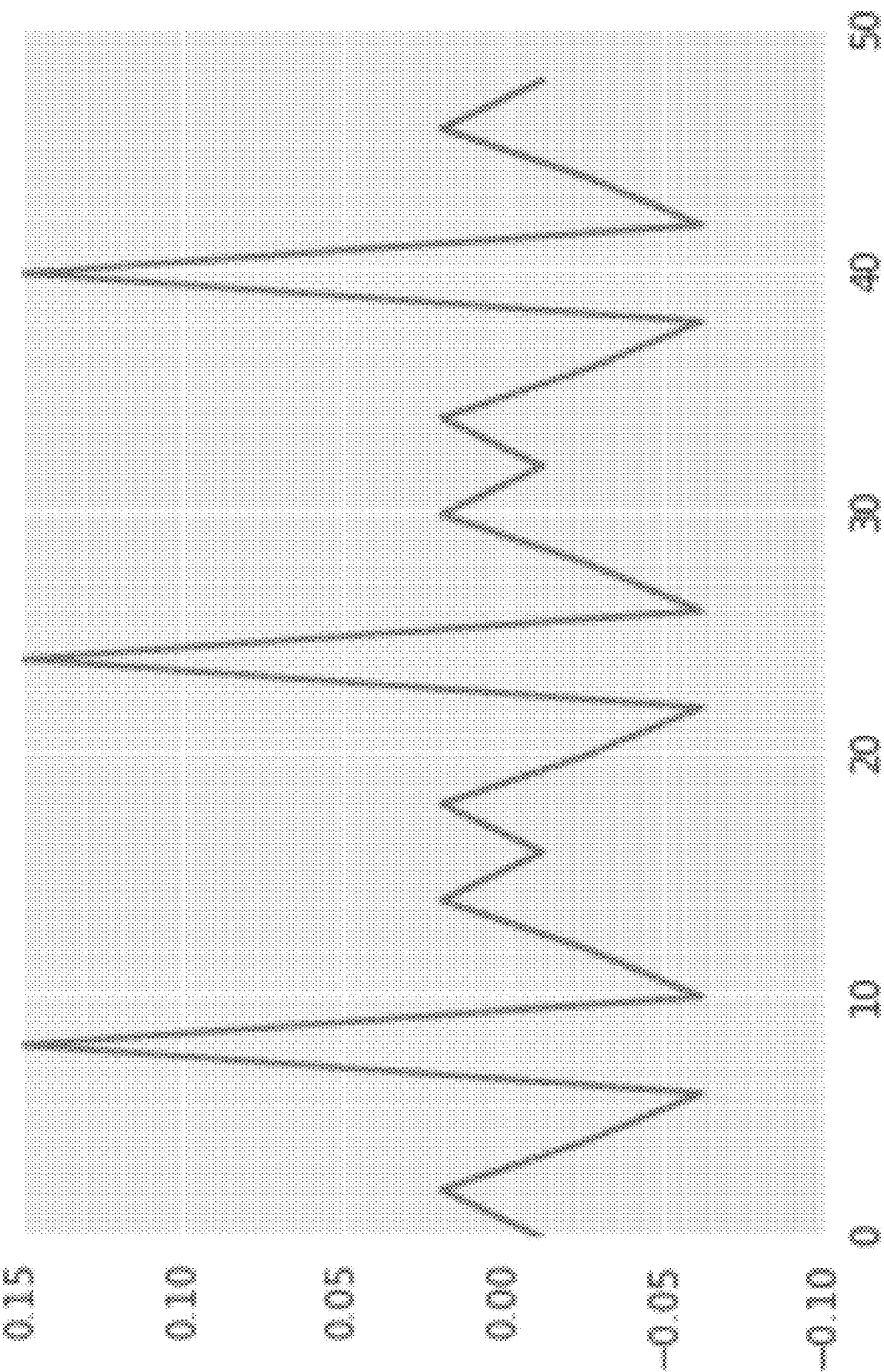
FIG. 6 illustrates an example match-filter created by a replication of a cross-correlation pattern.

In some implementations, the neural network is trained to estimate the cross-correlation of the embedded watermark sign matrix (FIG. 4, subplot (c)) which may be a replication of the same 200 ms pattern with one instance of the 200 ms pattern. Subplot (d) in FIG. 4 shows the cross-correlation. Cross correlation may encode information about the start of each sign matrix block and may non-zero for the entire duration of the watermark signal within the host signal.

The system may train the neural network using a multi-task loss function. The primary task may be the estimation of the ground truth cross-correlation, and the auxiliary tasks may be the estimation of energy perturbation pattern and/or the watermark magnitude spectra. Mean square error may be computed between the ground-truth(s) and network output(s). Some or all of the losses may be interpolated after scaling the auxiliary losses with regularization constants. In some implementations, bounding each network output to just cover the dynamic range of the corresponding ground-truth may improve performance.

Figure 7:
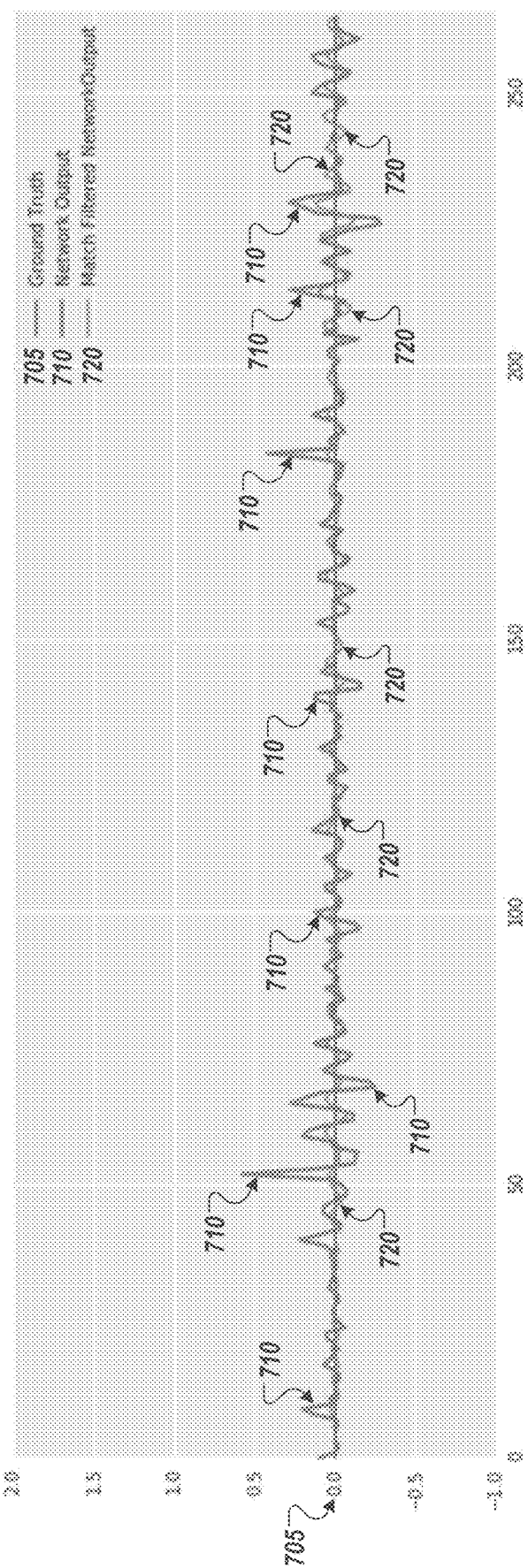
FIG. 7 illustrates an example neural network output and an example match-filtered neural network output for a non-watermarked signal.

In some implementations, the system may post process network outputs. In some implementations, the watermark may not have a payload message and a single sign matrix is replicated throughout the watermarking region. This may result in a cross-correlation pattern which is periodic (FIG. 4, subplot (d)). This aspect can be exploited to eliminate spurious peaks in the network outputs. In some implementations and to improve performance, the system may use a match-filter created by replicating the cross-correlation pattern (see FIG. 6) over band-pass filters isolating the frequency of interest. FIG. 7 compares the network outputs, generated for a non-watermarked signal, before and after match-filtering. In some implementations, spurious peaks which do not have periodicity can be significantly suppressed. The ground truth 705 may be approximately 0.0 (e.g., between −0.01 and 0.01) and may track the x-axis more closely than the network output 710 and the match filtered network output 720. The network output 710 may vary with respect to the x-axis more than the ground truth 705 and the match filtered network output 720. The match filtered network output 720 may track the x-axis more closely than the network output 710 and may not track the x-axis as closely as the ground truth 705. The match filtered network output 720 may be smoother than the network output 710. The match filtered network output 720 may remain within a smaller range than the network output 710. For example, the match filtered network output 720 may stay between −0.15 and 0.15. The network output 710 may stay between −0.30 and 0.60.

Once the neural network has been trained, it may be used in a method of determining whether a given audio data sample includes an audio watermark, by applying a model embodying the neural network to an audio data sample. The method may include determining a confidence score that reflects a likelihood that the audio data includes the audio watermark; comparing the confidence score that reflects the likelihood that the audio data includes the audio watermark to a confidence score threshold; and based on comparing the confidence score that reflects the likelihood that the audio data includes the audio watermark to the confidence score threshold, determining whether to perform additional processing on the audio data.

In an embodiment the method comprises: based on comparing the confidence score that reflects the likelihood that the audio data includes the audio watermark to the confidence score threshold, determining that the confidence score satisfies the confidence score threshold, wherein determining whether to perform additional processing on the audio data, comprises determining to suppress performance of the additional processing on the audio data. In an embodiment the method comprises: based on comparing the confidence score that reflects the likelihood that the utterance includes the audio watermark to the confidence score threshold, determining that the confidence score does not satisfy the confidence score threshold, wherein determining whether to perform additional processing on the audio data, comprises determining to perform the additional processing on the audio data. In an embodiment the method comprises: receiving, from a user, data confirming performance of the additional processing on the audio data; and based on receiving the data confirming performance of the additional processing on the audio data, updating the model. In an embodiment the additional processing on the audio data comprises performing an action based on a transcription of the audio data; or determining whether the audio data includes a particular, predefined hotword. In an embodiment the method comprises: before applying, to the audio data, the model (i) that is configured to determine whether the given audio data sample includes the audio watermark and (ii) that was trained using the watermarked audio data samples that include the audio watermark and the non-watermarked audio data samples that do not include the audio watermark, determining that the audio data includes a particular, predefined hotword. In an embodiment the method comprises determining that the audio data includes a particular, predefined hotword, wherein applying, to the audio data, the model (i) that is configured to determine whether the given audio data sample includes the audio watermark and (ii) that was trained using watermarked audio data samples that include the audio watermark and non-watermarked audio data samples that do not include the audio watermark is in response to determining that the audio data includes the particular, predefined hotword. In an embodiment the method comprises: receiving the watermarked audio data samples that include the audio watermark and the non-watermarked audio data samples that do not include the audio watermark; and training, using machine learning, the model using the watermarked audio data samples that include the audio watermark and the non-watermarked audio data samples that do not include the audio watermark. In an embodiment the method comprises: at least a portion of the watermarked audio data samples include the audio watermark at multiple, periodic locations.

Figure 8:
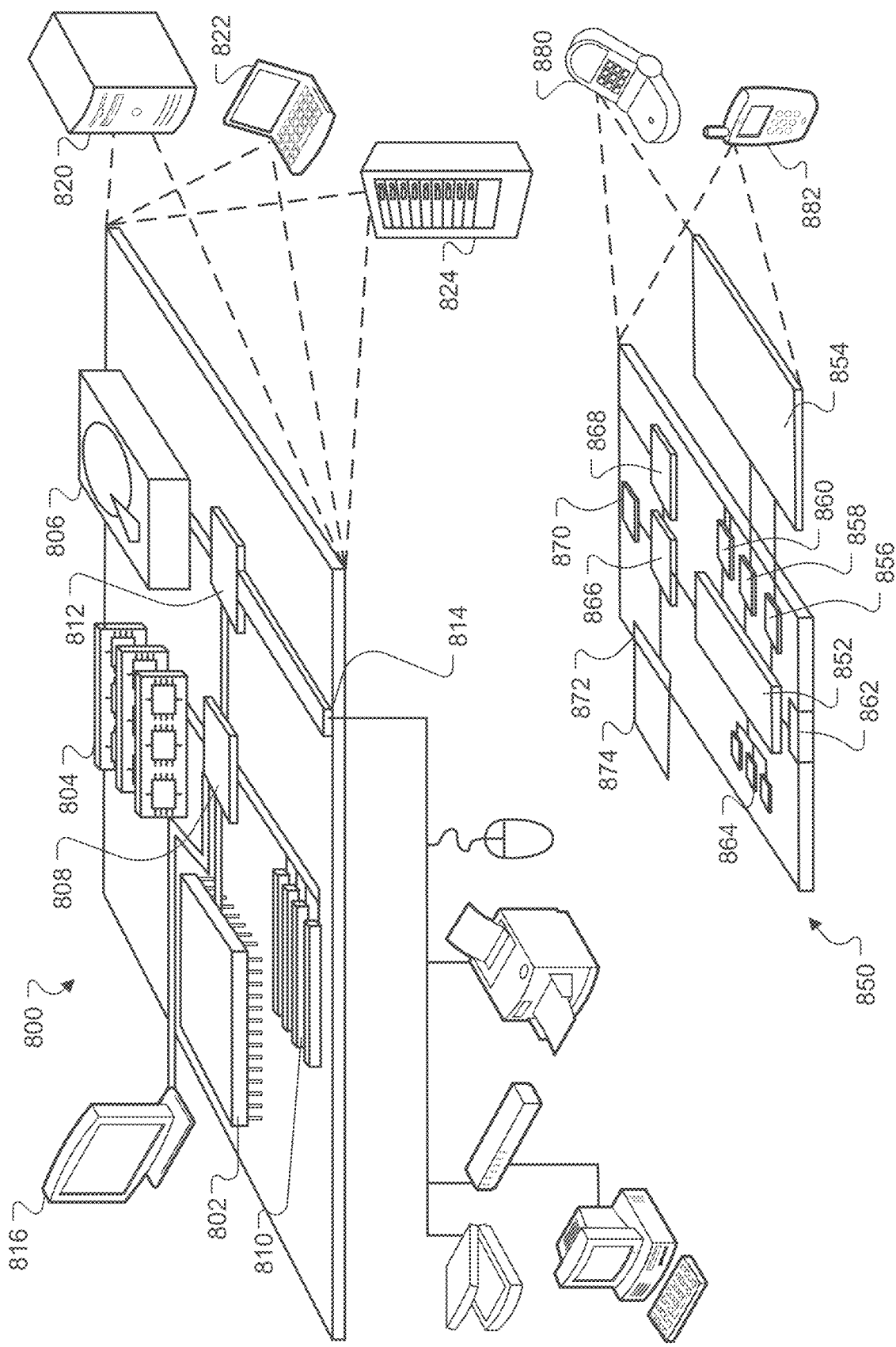
FIG. 8 illustrates an example of a computing device and a mobile computing device.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various buses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards. In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device, such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provided as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), COMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver. In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows described in the application do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims. Also, a feature described in one aspect or implementation may be applied in any other aspect or implementation.

What is claimed is:

1. A computer-implemented method, comprising:
    adding, by a first computing device, a first audio watermark to first speech data corresponding to playback of a first utterance including a hotword used to invoke an attention of a second computing device; and
    outputting, by the first computing device, the playback of the first utterance corresponding to the watermarked first speech data, to the second computing device, which is configured to receive the watermarked first speech data and determine to cease processing of the watermarked first speech data.

2. The method of claim 1, further comprising:
storing, by the first computing device, at least one of (i) data and time of outputting the playback of the first utterance, (ii) a location of the first computing device, (iii) a transcription of the playback of the first utterance, (iv) the watermarked first speech data, or (v) the first speech data without the first audio watermarks.

3. The method of claim 1, wherein the adding comprises:
identifying, by the first computing device, a portion of the first speech data for including audio samples of the hotword; and
adding, by the first computing device, the first audio watermark to the portion of the first speech data.

4. The method of claim 3, wherein the identifying comprises:
identifying, by the first computing device, the portion of the first speech data by performing a speech recognition on the first speech data.

5. The method of claim 3, wherein the first audio watermark is based on a spread spectrum technique, and the identifying comprises:
identifying, by the first computing device, the portion of the first speech data based on a minimum energy criterion.

6. The method of claim 1, wherein the adding comprises:
adding, by the first computing device, the first audio watermark at periodic intervals to the first speech data.

7. The method of claim 1, wherein the adding comprises:
adding, by the first computing device, an audio fingerprint to the first speech data.

8. The method of claim 1, further comprising:
adding, by the first computing device, a second audio watermark to second speech data corresponding to playback of a second utterance including the hotword, a query included in the second utterance being different from a query included in the first utterance, and the second audio watermark being different from the first audio watermark.

9. The method of claim 1, wherein the second computing device is configured to determine the watermarked first speech data includes the first audio watermark based on a model (i) that is configured to determine whether a given audio data sample includes an audio watermark and (ii) that was trained using watermarked audio data samples that each include an audio watermark sample and non-watermarked audio data samples that do not each include an audio watermark sample.

10. An apparatus, comprising:
processing circuitry configured to
add a first audio watermark to first speech data corresponding to playback of a first utterance including a hotword used to invoke an attention of a client device, and
output the playback of the first utterance corresponding to the watermarked first speech data, to the client device, which is configured to receive the watermarked first speech data and determine to cease processing of the watermarked first speech data.

11. The apparatus of claim 10, wherein the processing circuitry is configured to:
store at least one of (i) data and time of outputting the playback of the first utterance, (ii) a location of the apparatus, (iii) a transcription of the playback of the first utterance, (iv) the watermarked first speech data, or (v) the first speech data without the first audio watermarks.

12. The apparatus of claim 10, wherein the processing circuitry is configured to add the first audio watermark by:
identifying a portion of the first speech data for including audio samples of the hotword, and
adding the first audio watermark to the portion of the first speech data.

13. The apparatus of claim 12, wherein the identifying of the portion of the first speech data comprises:
identifying the portion of the first speech data by performing a speech recognition on the first speech data.

14. The apparatus of claim 12, wherein the first audio watermark is based on a spread spectrum technique, and the identifying of the portion of the first speech data comprises:
identifying the portion of the first speech data based on a minimum energy criterion.

15. The apparatus of claim 10, wherein the processing circuitry is configured to add the first audio watermark by:
adding the first audio watermark at periodic intervals to the first speech data.

16. The apparatus of claim 10, wherein the processing circuitry is configured to add the first audio watermark by:
adding an audio fingerprint to the first speech data.

17. The apparatus of claim 10, wherein the processing circuitry is configured to:
add a second audio watermark to second speech data corresponding to playback of a second utterance including the hotword, a query included in the second utterance being different from a query included in the first utterance, and the second audio watermark being different from the first audio watermark.

18. The apparatus of claim 10, wherein the client device is configured to determine that the watermarked first speech data includes the first audio watermark based on a model (i) that is configured to determine whether a given audio data sample includes an audio watermark and (ii) that was trained using watermarked audio data samples that each include an audio watermark sample and non-watermarked audio data samples that do not each include an audio watermark sample.

19. A non-transitory computer-readable storage medium including computer executable instructions, wherein the instructions, when executed by a computer, cause the computer to perform a method, the method comprising:
adding a first audio watermark to first speech data corresponding to playback of a first utterance including a hotword used to invoke an attention of a client device; and
outputting the playback of the first utterance corresponding to the watermarked first speech data, to the client device, which is configured to receive the watermarked first speech data and determine to cease processing of the watermarked first speech data.

20. The non-transitory computer-readable storage medium of claim 19, wherein the method comprises:
adding a second audio watermark to second speech data corresponding to playback of a second utterance including the hotword, a query included in the second utterance being different from a query included in the first utterance, and the second audio watermark being different from the first audio watermark.

* * * * *